United States Patent [19]
Assie

[11] Patent Number: 6,102,838
[45] Date of Patent: Aug. 15, 2000

[54] METHOD FOR OPERATING MACHINE TOOL FOR MACHINING CRANKSHAFT FOR ENGINES

[75] Inventor: Jean-Paul Assie, Castres, France

[73] Assignee: Renault-Automation, Boulogne-Billancourt, France

[21] Appl. No.: 09/189,944

[22] Filed: Nov. 12, 1998

Related U.S. Application Data

[62] Division of application No. 08/849,213, filed as application No. PCT/FR95/01633, Dec. 8, 1995.

[30] Foreign Application Priority Data

Dec. 9, 1994 [FR] France .................................. 94 14826

[51] Int. Cl.[7] ............................. B23Q 3/157; B23B 5/18; B23C 3/06
[52] U.S. Cl. .................................. 483/1; 82/1.1; 82/106; 82/129; 409/200; 483/14; 483/15
[58] Field of Search ....................... 29/563, 6.01; 483/14, 483/15, 55, 56, 1; 409/199, 200, 203, 202, 212, 702; 451/249, 334, 362, 360; 82/106, 129, 122

[56] References Cited

U.S. PATENT DOCUMENTS

| | | | |
|---|---|---|---|
| 2,643,570 | 6/1953 | Siekmann et al. | 82/125 |
| 4,305,232 | 12/1981 | Price | 451/249 |
| 4,457,193 | 7/1984 | Matthey | 82/125 |
| 4,711,016 | 12/1987 | Genschow et al. | 483/15 |
| 4,729,159 | 3/1988 | Henneberg | 483/14 |
| 4,736,512 | 4/1988 | Gusching et al. | 483/14 |
| 4,893,398 | 1/1990 | Zimmer | 483/14 |
| 5,081,889 | 1/1992 | Takano et al. | 82/122 |

FOREIGN PATENT DOCUMENTS

| | | |
|---|---|---|
| 0318966 | 3/1989 | European Pat. Off. . |
| 417446 | 3/1991 | European Pat. Off. . |
| 136701 | 6/1986 | Japan ................ 82/129 |
| 4008401 | 1/1992 | Japan ................ 82/129 |
| 1650374 | 5/1991 | U.S.S.R. ............ 82/129 |
| 832757 | 4/1960 | United Kingdom . |
| 832758 | 4/1960 | United Kingdom . |
| 832759 | 4/1960 | United Kingdom . |
| 1265409 | 3/1972 | United Kingdom . |
| 8700464 | 1/1987 | United Kingdom ... 82/129 |
| 2262061 | 6/1993 | United Kingdom ... 82/129 |

*Primary Examiner*—William Briggs
*Attorney, Agent, or Firm*—Oblon, Spivak, McClelland, Maier & Neustadt, P.C.

[57] ABSTRACT

A machine tool for machining crankshafts (200), including, arranged in the same horizontal plane on a frame extending along the transfer axis (arrow A) of a machining line (C), a machining station (P1) with two tool holder discs (110, 120) for machining the crankshafts (200), and two parallel work stations (S1, S2) arranged upstream and downstream from the machining station (P1) for rotating the two crankshafts, whereby the tool holder disc (110, 120) of the machining station, movably mounted (arrow X) along the transfer axis (arrow A) can move back and forth between one work station (S1 or S2) and the other (S2 or S1) and machine a crankshaft (200) at a work station (S1 or S2) during the auxiliary operations needed to position a new crankshaft (200) in the other work station (S2 or S1), and vice versa. An operating method and a machining line comprising such a machine tool are also disclosed. Said machine tool is useful for turning/shaving crankshafts for engines with four in-line cylinders.

10 Claims, 7 Drawing Sheets

METHOD FOR OPERATING MACHINE TOOL FOR MACHINING CRANKSHAFT FOR ENGINES

This application is a Division of application Ser. No. 08/849,213 pending Filed on Aug. 20, 1997, which is a 371 appln. of PCT/FR95/01633, filed on Dec. 8, 1995.

BACKGROUND OF THE INVENTION

This invention comes within the field of crankshaft machining and concerns, in particular, a machine tool for turning and shaving crankshafts for engines.

The present machine tools for turning and shaving crankshafts designed for engines are of the type comprising a frame that contains a work station ensuring the rotation of a crankshaft and a machining station equipped with at least one tool holder for turning and shaving the crankshaft driven in rotation on the work station. The machining station and the drive station are generally arranged on an inclined plane in order to facilitate the extraction of shavings resulting from the machining operation.

Such a machine tool has a disadvantage as to its profitability, for a time delay is necessary between two machining operations on the same machine, in order to assume all of the operations of disengagement, unloading, loading, engagement and indexing of a crankshaft, called "auxiliary operations" within the context of this invention. For the turning and shaving of crankshafts designed for engines with four in-line cylinders, the applicant found that the times of the auxiliary operations were as long as the machining times, so that the effective machining times are cut in half, which is very detrimental to the efficiency of such machine tools.

On the basis of these findings, the applicant then conducted research which led to the study of a new machine tool design making it possible to overcome this type of problem, while offering numerous other advantages intended to improve the machining of crankshafts both quantitatively and qualitatively.

Although such a machine tool was conceived in the minds of the innovators to perform the operations of turning and shaving of crankshafts for engines with four in-line cylinders, it goes without saying that its basic concepts, which are going to be described and represented below for this specific type of application, may be easily adopted by the expert for other types of machining (grinding, simple turning, etc.) and other types of crankshafts.

SUMMARY OF THE INVENTION

The machine tool according to the invention, earmarked notably for turning and shaving crankshafts for engines with four in-line cylinders, is remarkable in that it contains, arranged on a frame along the transfer axis of a machining line of said crankshafts and in the same horizontal plane:
- a machining station equipped with at least one tool holder disk ensuring the crankshaft turning and shaving operations,
- and two work stations which, driving two crankshafts in rotation, are arranged parallel up and down the line from the machining station, so that the tool holder disk of the latter, movably mounted along the transfer axis, can move back and forth from one work station to another and ensure the machining of a crankshaft during the auxiliary operations necessary for installation of a new crankshaft on the other work station and vice versa.

The coplanar arrangement of the two work stations on both sides of a machining station, combined with the mobility of the latter between the two work stations, thus makes possible, during the auxiliary times necessary for the operations of disengagement, unloading, loading, engagement and indexing of a crankshaft on one work station, the operations of machining a crankshaft on the other work station by the tool holder disk of the same machining station. The quantitative ratio is therefore multiplied by two and the space occupied by the machine tool assembly is less than that occupied by two machine tools, a not negligible advantage, taking into account the cost per square meter occupied in an industrial zone.

According to a first preferred embodiment of the invention, the machining station is equipped with two tool holder disks movable along the transfer axis on one side, in order to move from one work station to the next, and along an axis perpendicular to the first, on the other, in order to approach and/or separate from each other, so as to ensure the machining of two different portions of the crankshaft from one work station to the other. Such kinematics is intended to employ an original method of operation, consisting of machining the outer crankpins or bearings of one crankshaft on one work station of a machine tool and the intermediate crankpins or bearings of another crashaft on the other. The method preferably consists of machining the outer bearings or crankpins on the first work station and the intermediate crankpins or bearings on the second work station, so that the crankshafts can be maintained by the headstocks of the second work station as close as possible to the intermediate crankpins or bearings to be machined. The fact that the bearing of the crankshafts on the second work station and, in general, on an area having already been machined on another work station can be brought as close as possible to the machining areas ensures very good isostatic stability of the crankshaft, while avoiding the use of guide rests, as in the machine tools of prior design.

According to a second preferred embodiment of the invention, the machining station is equipped with a tool holder disk movable along the transfer axis, on one side, from one work station to the other and along an axis perpendicular to the first, on the other, in order to move from one end of the crankshaft to the other, so as to ensure the machining of the ends of the latter from one work station to the other. This kinematics is intended to employ an original method of operation, consisting of machining on one work station of a machine tool one of the ends of a crankshaft, namely, the plate, and on the other work station the other end, namely, the tail of another crankshaft. As in the first embodiment and for purposes of better holding by the support and drive headstocks of the crankshaft in the work stations, the method consists of preferentially machining the plate on the first work station and the tail of the crankshafts on the second work station.

According to a preferred embodiment of the invention, the portal rising above the machine tool and ensuring transfer of the crankshafts from one work station to the other contains a carriage mounted sliding and advantageously possessing two clamps gripping the crankshafts, with a spacing equal to the spacing of the two work stations of the machine tool, so as to be able to carry out the operations of handling the crankshafts in pairs, simultaneously acting on the two work stations or on one station and another work station (inlet or outlet conveyor, for example) situated up or down the line from the machine tool. The carriage of that portal can also contain a tool holder magazine which, arranged between the two gripping clamps, ensures the removal and/or placement on top of the tools of the machining station, which has become less accessible laterally, by reason of the enclosure of the latter by the two work stations.

The invention also concerns a crankshaft machining line for four-cylinder engines containing at least three machine tools, one designed for machining the crankpins, the other for machining the bearings and the last for machining the ends (plate and tail), which are arranged below a portal ensuring guidance of the crankshaft transfer carriages and change of tools.

Although the main aspects of the invention considered new have been expressed above in their most elementary form, more ample details concerning a preferred embodiment of a machining line comprising machine tools following the basic concepts of the invention will be better understood by referring to the specification below and to the accompanying drawings illustrating those embodiments.

DETAILED DESCRIPTION OF THE PREFERRED EMBODIMENT

Figure 1:
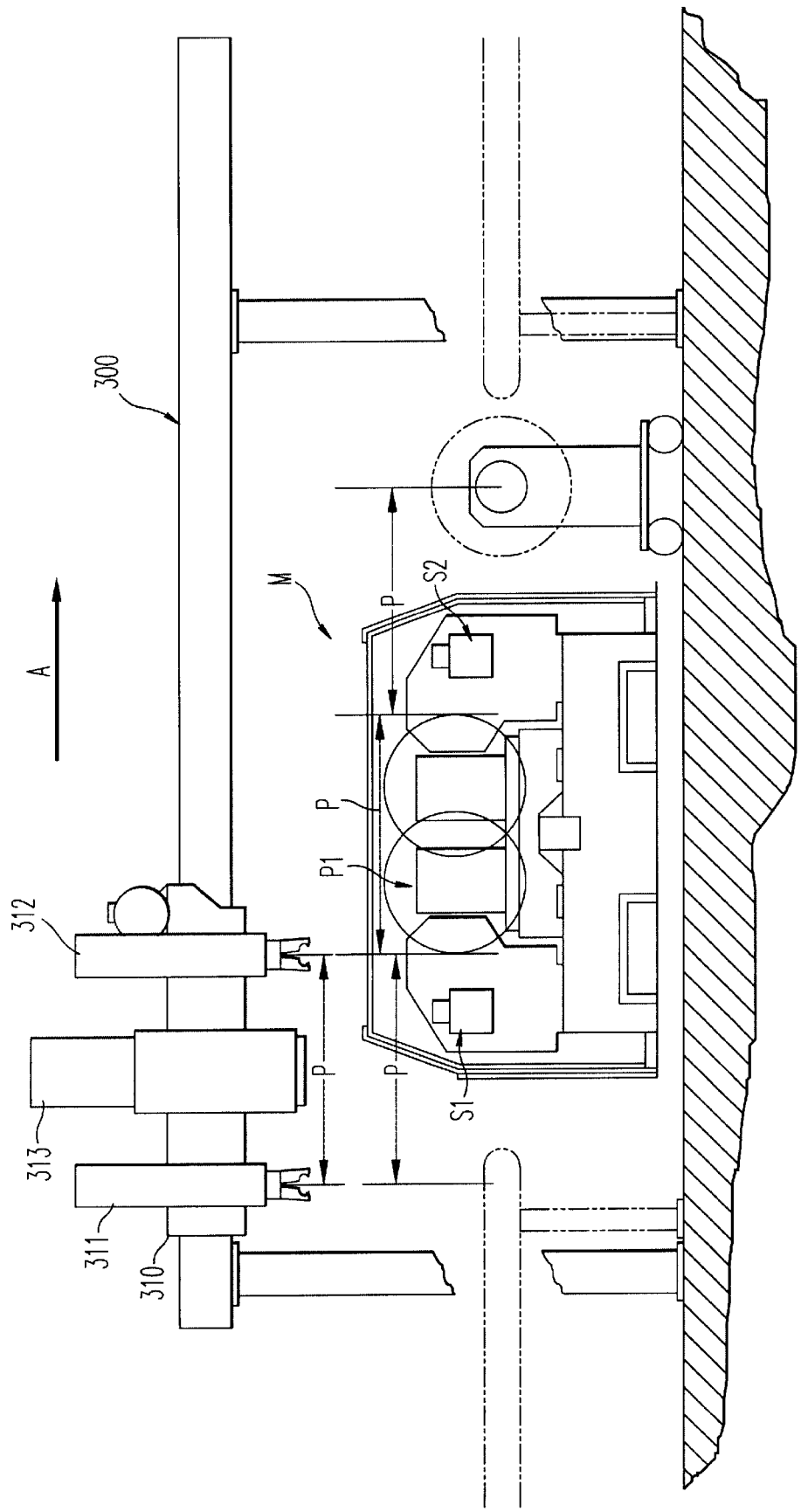
FIG. 1 is a side view of a machining line comprising a machine tool according to the invention, for the turning and shaving of a crankshaft for engines with four in-line cylinders.
Figure 2:
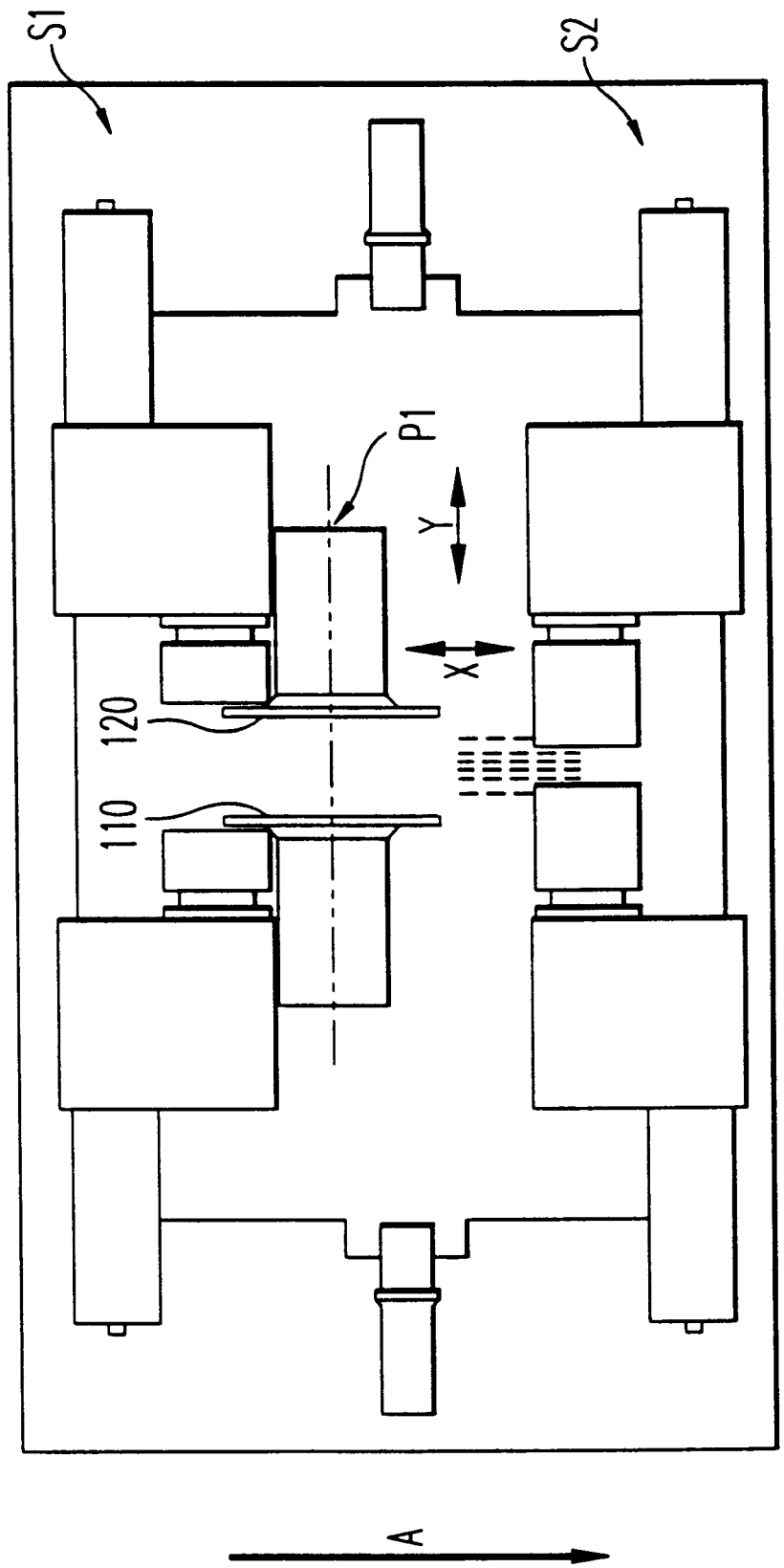
FIG. 2 is a schematic top view of the machine tool illustrated on the drawing of FIG. 1.

The machine tool of the invention, referenced M as a whole and represented on the drawings of FIGS. 1 and 2, is earmarked in the present case for the machining by turning and shaving of crankshafts for engines with four in-line cylinders.

Such a machine consists of a frame that is machine-welded in standard fashion with side frames properly assembled together to serve as a logical structure for the different components necessary for operation of the machine and to be described below. This frame can also include in its configuration a device for removal of the shavings resulting from machining, for purposes of recovery, to a channel provided in the floor or to conveyors installed under the work stations.

According to the principal arrangements of the invention, the frame is set up to receive along the transfer axis (symbolized by arrow A) and in the same horizontal plane:

a machining station P1, and two work stations S1 and S2 which, driving in rotation two crankshafts (not represented on these drawings for sake of greater clarity), are placed parallel on both sides of machining station P1.

Figure 3:
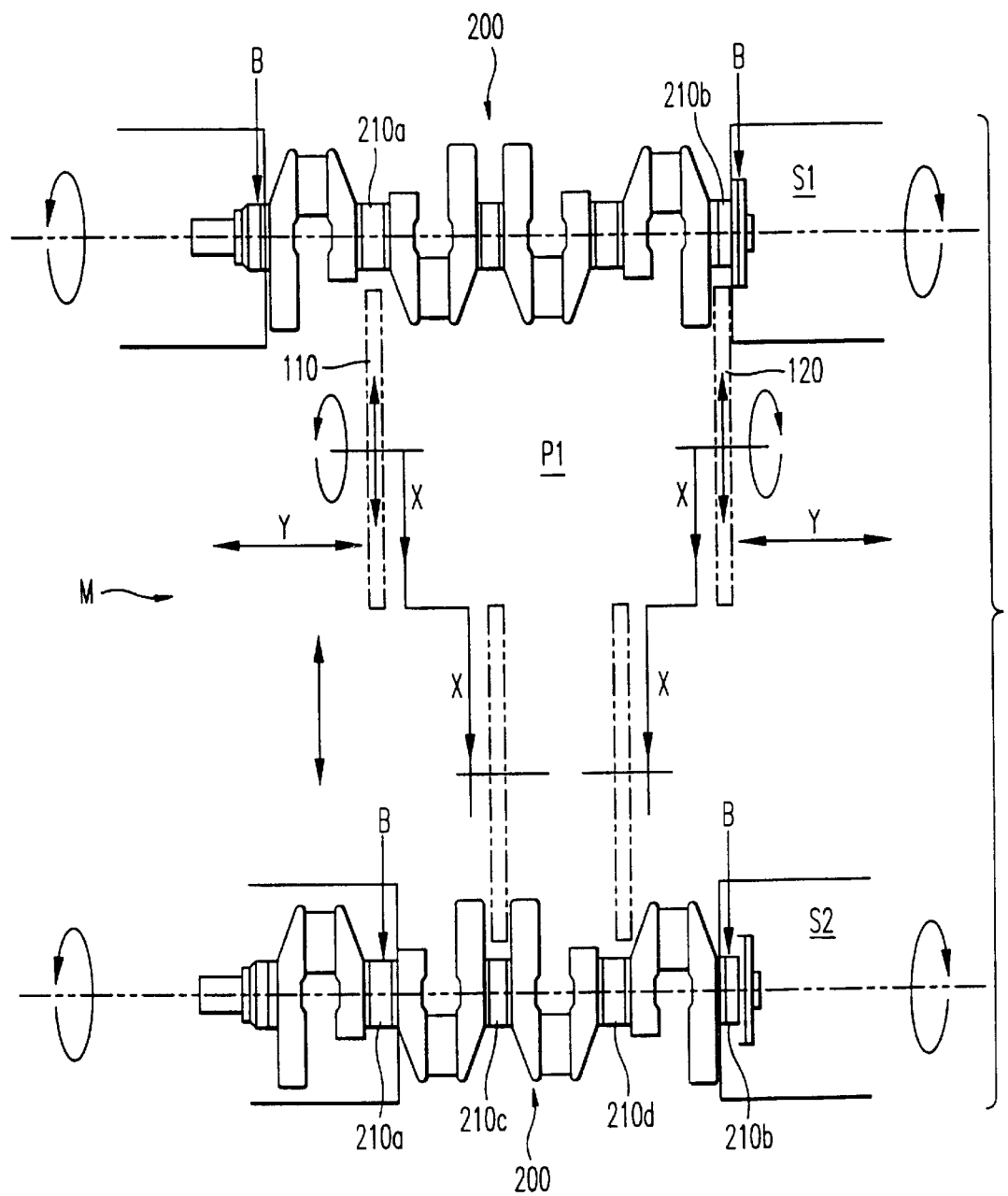
FIG. 3 is a schematic view illustrating the operation of a machine tool according to a first method of operation, intended to ensure the machining of the bearings of a crankshaft.
Figure 4:
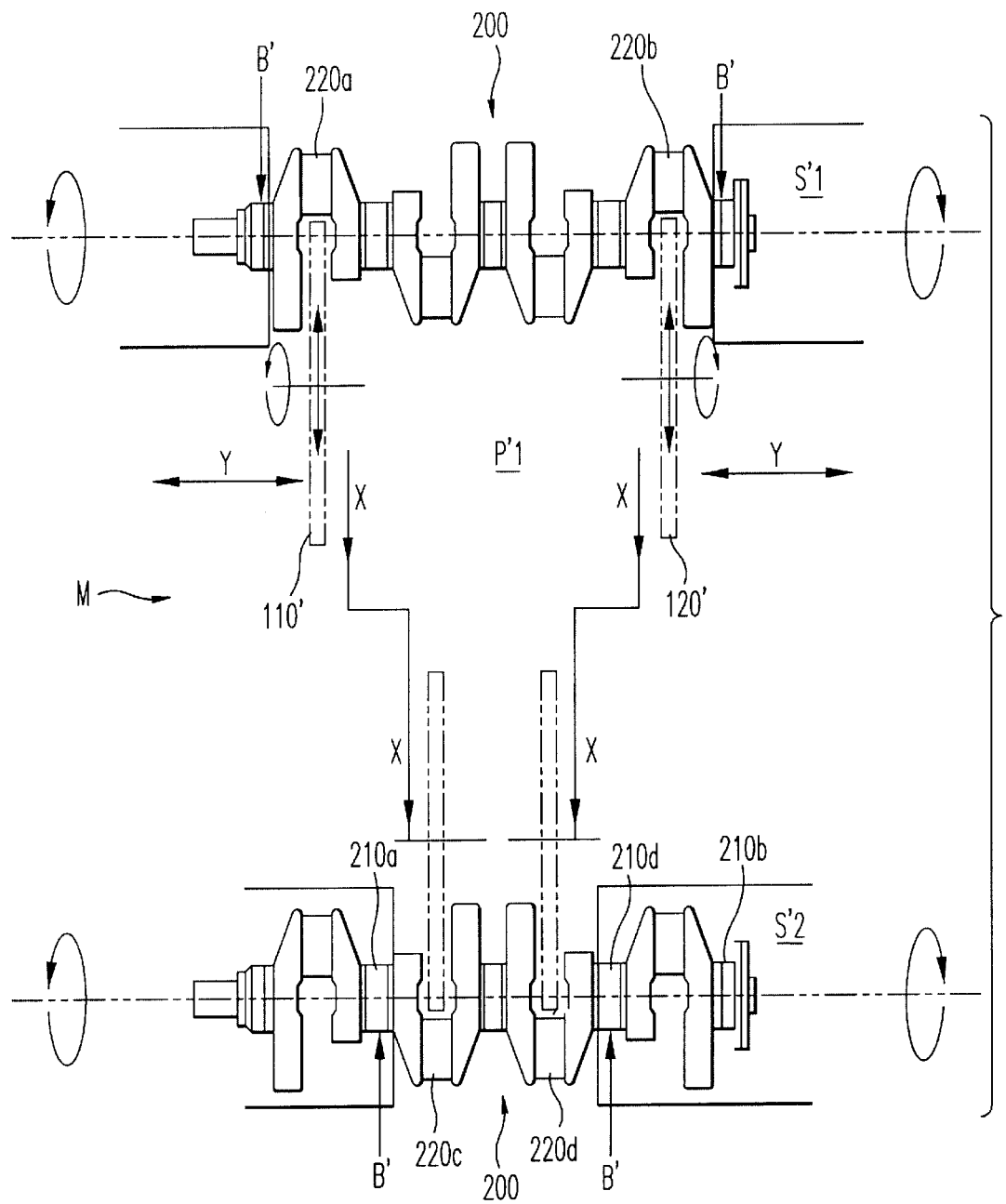
FIG. 4 is a schematic view illustrating the operation of a machine tool according to a second method of operation, intended to ensure the machining of the crankpins of a crankshaft.

As illustrated on the drawings of FIGS. 2, 3 and 4, the machining station P1 is equipped with two tool holder disks 110 and 120 ensuring the machining of the two crankshafts by turning and shaving and is movably mounted (arrow X) along the transfer axis (arrow A), so as to be able to move back and forth between the first work station S1 and the second work station S2, for the purpose of ensuring the machining of a crankshaft during the auxiliary operations necessary for installation of a new crankshaft on the other work station and vice versa.

On the other hand, the two tool holder disks 110 and 120 of said machining station, movably mounted along the transfer axis in order to move from one work station, S1 or S2, to the other, S2 or S1, are also driven in a translational motion (arrow Y) along an axis perpendicular to the transfer axis (arrow A), in order to approach and/or separate from one another for purposes of machining of two different portions of the crankshaft of a work station S1 or S2 to the other. As indicated at the beginning of this specification, this double mobility X and Y of the tool holder disks 110 and 120 between the two work stations S1 and S2 makes it possible to assume the use of an original method of operation, which is illustrated in greater detail on the drawings of FIGS. 3 and 4.

The drawing of FIG. 3 is intended to illustrate through a block diagram the kinematics of the machining station P1 and of the two work stations S1 and S2 of a machine M ensuring the machining by turning and shaving of the bearings 210a, 210b, 210c, 210d of a crankshaft 200. As can be seen on that drawing, the two tool holder disks 110 and 120, represented by solid lines, machine by turning and shaving the outer bearings 210a and 210b of the crankshaft 200 held at its ends in the headstocks of work station S1, not represented, but whose points of engagement are symbolized by arrows B. Then, when that machining is completed, machining station P1 is shifted (arrows X) to the opposite work station S2, while the two tool holder disks 110 and 120 approach one another (arrows Y), as represented by lines of dots and dashes on the drawing. The crankshaft 200 installed in work station S2 is then machined by turning and shaving in its center bearings 210c and 210d with maintenance of the crankshaft in the headstocks of work station S2 as close as possible to the machining area by means of an engagement on the outer bearings 210a and 210b previously machined on station S1.

The drawing of FIG. 4 is intended to illustrate through a block diagram the kinematics of machining station P'1 and of the two work stations S'1 and S'2 of a machine M' ensuring the machining by turning and shaving of the crankpins 220a, 220b, 220c, 220d of a crankshaft 200. As can be seen on that drawing, the two tool holder disks 110' and 120', represented by solid lines, machine by turning and shaving the outer crankpins 220a and 220b of the crankshaft 200 held at its ends in the headstocks of work station S'1, not represented, but whose points of engagement are symbolized by arrows B'. Then, when that machining is completed, the machining station P'1 is shifted (arrows X) to the opposite work station S'2, while the two tool holder disks 110' and 120' approach one another (arrows Y), as represented by lines of dots and dashes on the drawing. The crankshaft 200 installed in work station S'2 is then machined by turning and shaving in its center crankpins 220c and 220d with maintenance of the crankshaft in the headstocks of work station S'2 as close as possible to the machining area by means of an engagement (arrows B') on the bearings 210a and 210d previously machined on the machine M.

It is useful to point out that the crankshaft 200 represented on the drawings of FIGS. 3 and 4 was considered the same at a given instant in order to demonstrate the machining cycles better. In fact, as described below, the crankshaft handling cycles will be so adjusted that each crankshaft is machined in all of the stations, S1, S2, S'1 and S'2.

Figure 5:
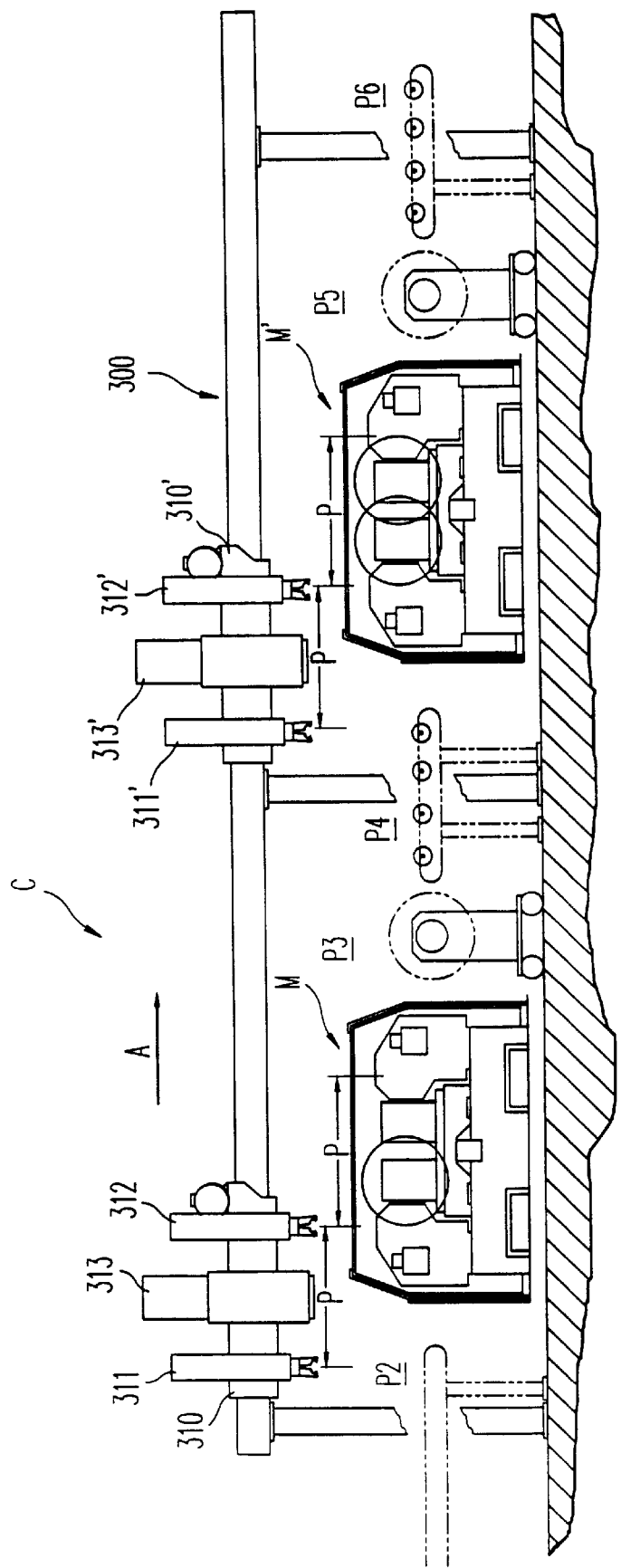
FIG. 5 is a side view of a machining line comprising two machine tools, one using the first method of operation for machining the bearings of a crankshaft and the other the second method of operation for machining the crankpins.

This method of operation is of greater interest when the machining line C, as illustrated on the drawing of FIG. 5, comprises in series, in the direction of transfer (arrow A), the two machine tools M and M', the first capable of machining the four bearings 210a, 210b, 210c, 210d of the crankshaft 200 and the other the four crankpins 220a, 220b, 220c, 220d. Depending on the type of machining line C in which the machine tools of the invention are included, other conveying or buffer stock stations P2, P3, P4, P5, P6 can be arranged up and down the line from the two machine tools M and M1, demonstrating that the latter can easily be inserted in an already existing line.

Referring again to the drawing of FIG. 1, it will be noted that machine M is surmounted by a portal 300 which ensures, via a moving carriage 310, transfer of the crankshafts 200 from one work station S1 or S2 to the other work station S2 or S1. For that purpose, the carriage 310 of this portal 300 is equipped with two clamps 311 and 312 gripping the crankshafts 200, having a spacing "p" equal to the spacing "p" of the two work stations S1 and S2 of the machine tool M, so as to be able to use a duplex handling cycle between the two work stations S1 and S2, on one side, and with a work station S1 and S2 and an outer work station P2, P3, P4, P5, P6 (conveyor or buffer stock) situated up or down the line, on the other. By adapting that duplex handling cycle of the gripping clamps 311 and 312 of the carriage 310 of the portal 300 to the operating cycles of the machining station P1 and work stations S1 and S2 of the machine M, it is then possible to machine a crankshaft 200 on the two work stations S1 and S2 with practically no idle time of the two tool holder disks 110 and 120, except for the translational times (arrows X and Y) of the machining station P1 from one work station to the other. In fact, the machining times of machining station P2 on a work station are duly used to execute the auxiliary operations of disengagement, unloading, loading, engagement and indexing of a crankshaft on the other work station.

The carriage 310 of that portal 300 also contains a tool holder magazine 313 which, placed between the two gripping clamps 311 and 312, is intended to ensure the removal and/or placement on top of the tools on machining station P1.

Referring to the drawing of FIG. 5 representing the machining line C with the two machine tools M and M', it will be noted that the portal 300 contains two carriages 310 and 310', each offering the same equipment of two gripping clamps 311, 311', 312, 312' and one tool holder magazine 313, 313', each ensuring the handling cycle of the crankshafts 200 between the two machine tools M and M'. The spacing "p" between the components of the two machine tools will be identical.

Figure 6:
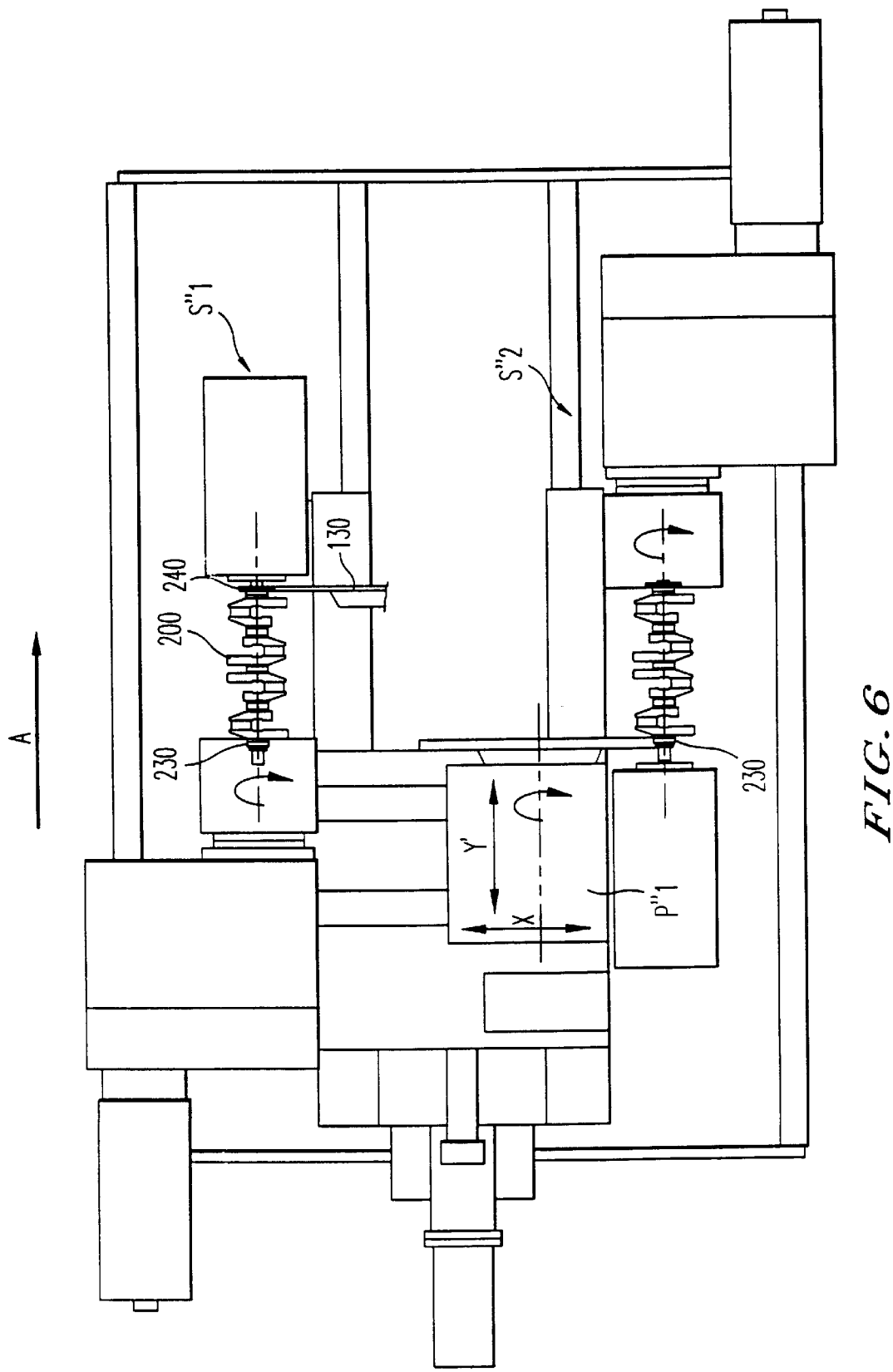
FIG. 6 is a schematic top view of the machine tool illustrated on FIG. 1, according to a third method of operation, intended to ensure the machining of the ends of a crankshaft.
Figure 7:
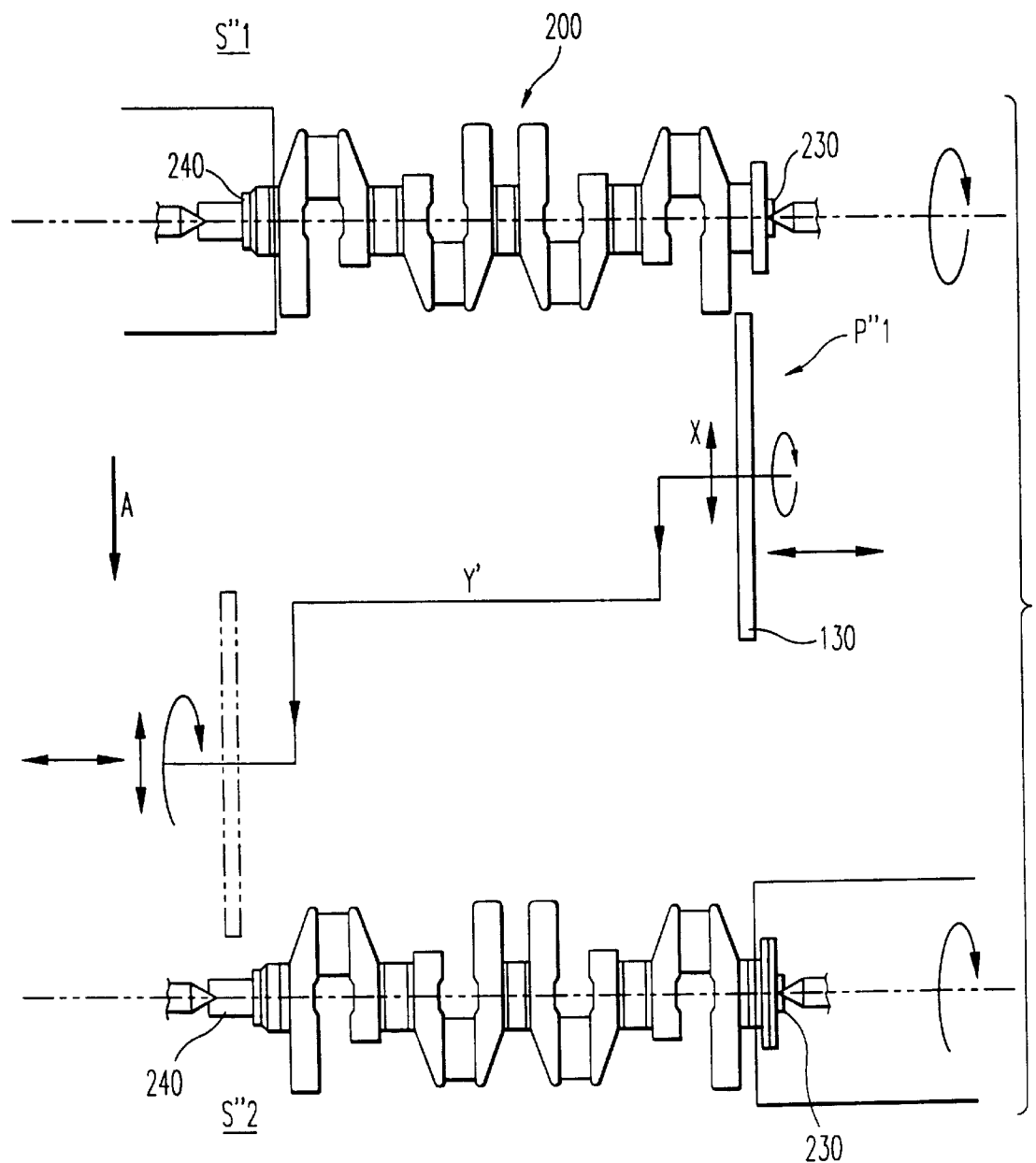
FIG. 7 is a schematic view illustrating the operation of the machine tool of FIG. 6.

As illustrated on the drawings of FIGS. 6 and 7, machining station P"1 is equipped with a single tool holder disk 130 ensuring the machining by turning and shaving of the ends of the two crankshafts 200 and, in particular, of their plate 230 and tail 240. This tool holder disk 130, also movably mounted (arrow X) along the transfer axis (arrow A), is driven in an alternating translational motion (arrow Y') along the axis perpendicular to the transfer axis (arrow A) in order to move from one end of the crankshaft to the other for purposes of machining the plate 230 and tail 240.

The drawing of FIG. 7 is intended to illustrate through a block diagram the kinematics of the machining station P"1 and of the two work stations S"1 and S"2 of a machine M" ensuring the machining by turning and shaving of the plate 230 and tail 240 of a crankshaft 200. The tool holder disk 130 represented by solid lines, machines by turning and shaving the plate 240 of the crankshaft 200, on its face and its diameter, held at its ends in the headstocks of work station S"1. Then, when that machining is completed, machining station P"1 is shifted (arrows X) to the opposite work station S"2, while directing (arrows Y') the tool holder disks 130 to the other end of the crankshaft 200, where it is represented by lines of dots and dashes. The crankshaft 200 installed in work station S"2 is then machined by turning and shaving in its outer bearing and tail 240.

The crankshaft 200 is also in the present case considered the same at a given instant, in order to demonstrate the machining cycles better, and the handling cycles of the crankshafts are so adjusted that each crankshaft 200 is machined in all of the stations S1, S2, S'1, S'2, S"1, S"2 of a machining line C, which will integrate in series in the direction of transfer (arrow A) the three machine tools M, M' and M", the first one capable of machining the four bearings 210a, 210b, 210c, 210d of the crankshaft 200, the second the four crankpins 220a, 220b, 220c, 220d, and the third the ends, namely, the face and diameter of the plate 230 and tail 240. The portal 300 will then contain three carriages, one for machine M, the other for machine M' and the third for machine M", each to ensure the handling cycle of the crankshafts 200 among the three machine tools M, M' and M". The spacing "p" between the components of the three machine tools M, M' and M" will then be identical.

In the present specification, the operation of the machining stations, work stations and portals has been shown in its most elementary form, deliberately leaving out the different elements necessary for their use, which come within the ordinary competence of the expert specialized in the methods employed.

It is to be understood that the machine tools M, M' and M" and the machining line C comprising them have just been described and represented above with a view to disclosure rather than limitation. Different adjustments, modifications and improvements of course may be introduced in the examples above, without thereby departing from the scope of the invention, considered in its broadest aspects and spirit.

To facilitate a better understanding of the drawings, a list of references with their legends is enumerated below.

| | |
|---|---|
| M | Machine tool for machining bearings |
| M' | Machine tool for machining crankpins |
| M" | Machine tool for machining the plate and tail |
| C | Machining line |
| P1, P'1, P"1 | Machining stations |
| S1, S2, S'2, S'2, S"1, S"2 | Work stations |
| P2, P3, P4, P5, P6 | Outer work stations |
| 110, 110', 120, 120', 130 | Tool holder disks |
| 200 | Crankshaft |
| 210a, 210b | Outer bearings |
| 210c, 210d | Center bearings |
| 220a, 220b | Outer crankpins |
| 220c, 220d | Center crankpins |
| 230 | Plate |
| 240 | Tail |
| 300 | Transfer portal |

| | -continued |
|---|---|
| 310, 310' | Carriages |
| 311, 311', 312, 312' | Gripping clamps |
| 313, 313' | Tool holder magazines |
| "p" | Spacing |
| Arrow A | Transfer axis |
| Arrows B, B' | Points of engagement of crankshafts 200 |
| Arrow X | Translational motion of the machining station parallel to the transfer axis |
| Arrow Y | Translational motion of the tool holder disks 110, 110', 120, 120' of machining station P1 or P'1, normal to the transfer axis |
| Arrow Y' | Translational motion of the tool holder disk 130 of machining station P"1, normal to the transfer axis |

I claim:

1. A method of machining crankshafts for engines using a machine tool including a machining station having at least one tool holder, and two work stations respectively positioned at opposite sides of the machining station, each of the work stations including means for rotatably holding a crankshaft, the method comprising the steps of:

supporting a crankshaft in each of said work stations by at least one of bearings and crankpins of the crankshaft;

machining outer bearings or crankpins of a crankshaft in a first of said work stations;

moving a tool holder of the machining station to a second of said work station; and machining inner bearings or crankpins of a crankshaft in the second work station.

2. The method according to claim 1, wherein the crankshaft in the second work station is held therein via bearings or crankpins located closest to the bearings or crankpins being machined in the second work station.

3. The method according to claim 1, wherein the crankshaft in the second work station is held therein via already machined bearings or crankpins located closest to the bearings or crankpins being machined in the second work station.

4. A method of machining crankshafts for engines using a machine tool including a machining station having at least one tool holder, and two work stations respectively positioned at opposite sides of the machining station, each of the work stations including means for rotatably holding a crankshaft, the method comprising the steps of:

supporting a crankshaft in each of said work stations;

machining one of an outer plate or tail forming an end of a crankshaft in a first of said work stations;

moving a tool holder of the machining station to a second of said work stations; and machining the other of the outer plate or tail in the second of said work stations.

5. The method of operation according to claim 4, wherein the outer plate is machined in the first work station and the tail is machined in the second work station.

6. A method of machining crankshafts for engines using a series of three machine tools, each said machine tool including a machining station having at least one tool holder, and two work stations respectively positioned at opposite sides of the machining station, each of the work stations including means for rotatably holding a crankshaft, the method comprising the steps of:

machining the bearings of a crankshaft in the first machine tool;

machining the crankpins of a crankshaft in the second machine tool; and machining the plate and tail of a crankshaft in the third machine tool.

7. The method of claim 6 including the step of transferring the crankshafts amongst the machine tools using a portal movable amongst the machine tools and having gripping clamps spaced with the same spacing as the work stations in each of said machine tools.

8. The method of claim 6, wherein:

said step of machining bearings of a crankshaft in the first machine tool comprises machining outer bearings in a first of said work stations of the first machine tool, moving a tool holder of the machining station of the first machine tool to a second of said work stations of the first machine tool, and machining inner bearings of a crankshaft in the second work station of the first machine tool;

said step of machining crankpins of a crankshaft in the second machine tool comprises machining outer crankpins in a first of said work stations of the second machine tool, moving a tool holder of the machining station of the second machine tool to a second of said work stations of the second machine tool, and machining inner crankpins of a crankshaft in the second work station of the second machine tool;

said step of machining the plate and tail of a crankshaft in the third machine tool comprises machining the plate in a first of said work stations of the third machine tool, moving a tool holder of the machining station of the third machine tool to the second work station of the third machine tool, and machining the tail of a crankshaft in the second work station of the second machine tool; and transferring the crankshafts from the first to the second work station of each said machine tool, and amongst the machine tools, using a portal movable amongst the machine tools and having gripping clamps spaced with the same spacing as the work stations in each of said machine tools, such that each crankshaft is machined in each work station of each of said machine tools.

9. The method according to claim 8, wherein, in said first and second machine tools, the crankshaft in the second work station is held therein via bearings or crankpins located closest to the bearings or crankpins being machined in the second work station.

10. The method according to claim 8, wherein, in said first and second machine tools, the crankshaft in the second work station is held therein via already machined bearings or crankpins located closest to the bearings or crankpins being machined in the second work station.

* * * * *